(12) United States Patent
Yun

(10) Patent No.: US 8,537,229 B2
(45) Date of Patent: Sep. 17, 2013

(54) IMAGE RECONSTRUCTION

(75) Inventor: Il Dong Yun, Seongnam-si (KR)

(73) Assignee: Hankuk University of Foreign Studies Research and Industry—University Cooperation Foundation, Seongnam-si (KR)

( * ) Notice: Subject to any disclaimer, the term of this patent is extended or adjusted under 35 U.S.C. 154(b) by 285 days.

(21) Appl. No.: 12/303,632

(22) PCT Filed: Apr. 10, 2008

(86) PCT No.: PCT/KR2008/002033
§ 371 (c)(1),
(2), (4) Date: Sep. 3, 2010

(87) PCT Pub. No.: WO2009/125883
PCT Pub. Date: Oct. 15, 2009

(65) Prior Publication Data
US 2011/0028183 A1 Feb. 3, 2011

(51) Int. Cl.
*H04N 5/225* (2006.01)
*H04N 13/02* (2006.01)
*H04N 5/262* (2006.01)
*H04N 5/222* (2006.01)
*G06K 9/00* (2006.01)

(52) U.S. Cl.
USPC .......... 348/218.1; 348/46; 348/239; 348/370; 382/154

(58) Field of Classification Search
USPC ................... 348/46–8, 50, 218.1, 222.1, 239, 348/370–371; 382/154
See application file for complete search history.

(56) References Cited

U.S. PATENT DOCUMENTS

| | | | |
|---|---|---|---|
| 7,567,703 B2 * | 7/2009 | Jones et al. | 382/154 |
| 7,769,205 B2 * | 8/2010 | Arias-Estrada et al. | 382/106 |
| 8,121,352 B2 * | 2/2012 | Arias-Estrada et al. | 382/106 |
| 2009/0167843 A1 * | 7/2009 | Izzat et al. | 348/43 |
| 2009/0322745 A1 * | 12/2009 | Zhang et al. | 345/420 |
| 2010/0182406 A1 * | 7/2010 | Benitez | 348/46 |
| 2010/0290697 A1 * | 11/2010 | Benitez et al. | 382/154 |

* cited by examiner

*Primary Examiner* — Daniel M Pasiewicz
(74) *Attorney, Agent, or Firm* — NSIP Law

(57) ABSTRACT

Techniques for reconstructing an image of an object are provided. In some embodiments, an image reconstructing system includes one or more cameras, one or more light sources and an image processor. The cameras are configured to capture images of an object and the light sources are configured to irradiate the object. The image processor is configured to process the images to generate a first representation of the object and a second representation of the object, and to generate a reconstructed image of the object based on the first representation and the second representation.

18 Claims, 3 Drawing Sheets

IMAGE RECONSTRUCTION

RELATED APPLICATIONS

This application is the U.S. National Phase under 35 U.S.C. §371 of International Application No. PCT/KR2008/002033 entitled IMAGE RECONSTRUCTION, filed in English on Apr. 10, 2008, designating the U.S. The content of this application is incorporated herein by reference in its entirety.

TECHNICAL FIELD

The present disclosure relates generally to image reconstruction technologies.

BACKGROUND

Recently, the use of three-dimensional (3-D) images is becoming increasingly popular due to the increased demand for applications utilizing 3-D features of an image. In line with that trend, determination of 3-D data from images is of central importance, e.g., in the fields of image reconstruction, machine vision, and the like. Machine vision has a wide range of potential applications including but not limited to three-dimensional map building data visualization and robot pick-and-place operations.

Typical techniques for implementing 3-D vision include geometric stereo and photometric stereo. In geometric stereo, images of an object are captured by employing, e.g., two cameras disposed at different positions, and measuring disparity between the corresponding points of the two images, thereby building a depth map of the object. Meanwhile, photometric stereo involves using a camera to take pictures of an object by varying the position of a light source. The photometric stereo involves processing the pictures to obtain features of the object such as slope, albedo at each pixel of the picture of the object to reconstruct an image, thereby implementing a 3-D vision of the object. Photometric stereo can have varying results depending on the surface characteristics of the object.

Upon comparing the two methods, it is generally known that the geometric stereo method outperforms the photometric stereo method for an object having a complex and non-continuous surface (i.e., having a high texture component), while the photometric stereo method tends to be superior to the geometrical stereo method for an object having a relatively simple surface whose reflective characteristics are lambertian (i.e., a surface that may comply with a diffusion reflection model). Such limitation, i.e., the performance of the above two methods is dependent on certain qualities (e.g., surface characteristics) of an object, is the fundamental problem when the photometric or geometric stereo method is used.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

SUMMARY

Embodiments of image retrieval systems, image matching techniques and descriptor generating techniques are disclosed herein. In accordance with one embodiment, an image reconstructing system includes one or more cameras configured to capture images of an object, one or more light sources to emit light to the object, and an image processor configured to process the images to generate a first representation and a second representation of the object, and to generate a reconstructed image of the object based on the first and second representations.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout.

Figure 1:
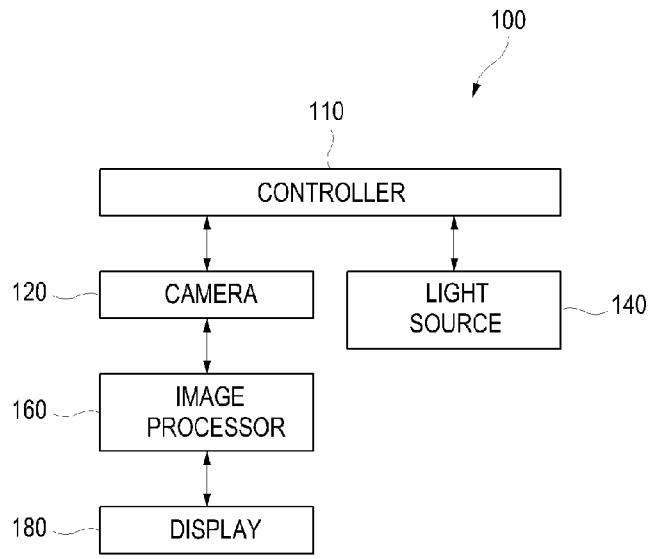
FIG. 1 shows a schematic block diagram of one embodiment of an image reconstructing system.

Referring to FIG. 1, one embodiment of an image reconstructing system 100 is illustrated. In certain embodiments, the image reconstructing system 100 may include a controller 110, a camera 120, a light source 140, an image processor 160 and a display 180. Each of the components 110, 120, 140, 160, and 180 may be provided on a single device or spread over several devices depending on the implementations. For example, the controller 110 and the image processor 160 may be implemented in a single integrated device with the camera 120 and the light source 140. Alternatively, the controller 110 and the image processor 160 may be implemented in a separable device detachable from a device embedding the camera 120 and the light source 140.

In an example use of the camera 120, a user may use the camera 120 to take pictures of an object by operating the controller 110 to adjust the light source 140. The camera 120 delivers the pictures to the image processor 160 by using various interfaces between the camera 120 and the image processor 160, including but not limited to a wired line, a cable, a wireless connection or any other interfaces, under the command or instructions of the controller 110. The image processor 160 may process the pictures to generate a reconstructed image of the object and deliver the reconstructed image to the display 180. The display 180 displays the reconstructed image, for example, for the user's reference.

In selected embodiments where the image processor 160 is installed on a separate device detachable from the camera 120, the image may be transmitted from the camera 120 to the image processor 160 using a wired, wireless communication protocol, or a combination thereof. For example, the wired or wireless communication protocol may be implemented by employing a digital interface protocol, such as a serial port, parallel port, PS/2 port, universal serial bus (USB) link, firewire/IEEE 1394 link, or wireless interface connection, such as an infra-red interface, BloothTooth, ZigBee, high definition multimedia interface (HDMI), high-bandwidth digital contents projection (HDCP), wireless fidelity (Wi-Fi), or the like. In one embodiment, the image reconstructing system 100 may be configured with a suitable operating system to install and run executable code, programs, etc., from one or more computer readable media, such as a floppy disk, CD-ROM, DVD, a detachable memory, a USB memory, a memory stick, a memory card or the like.

Figure 2:
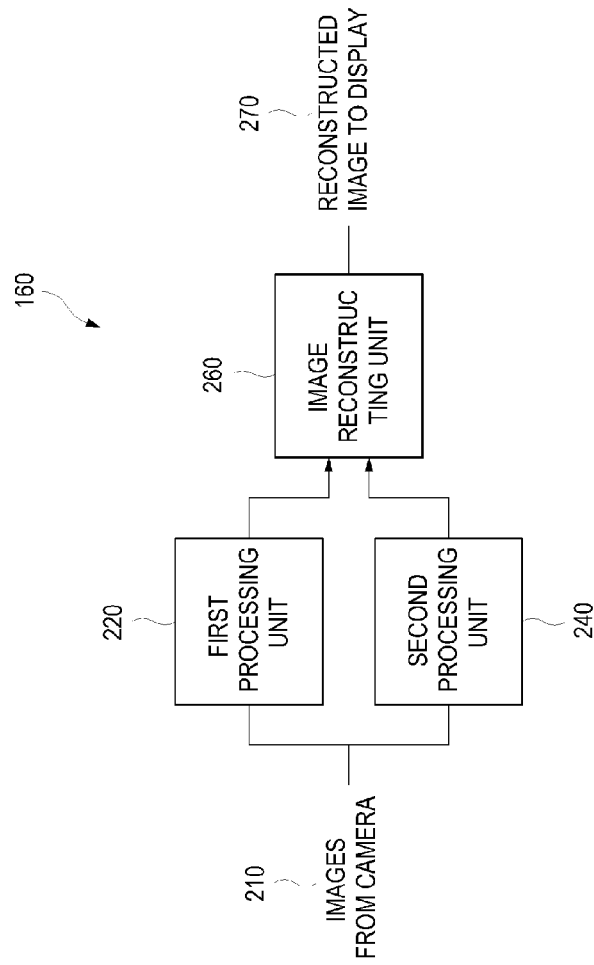
FIG. 2 is a more detailed schematic block diagram of one embodiment of an image processor of an image reconstructing system.

Referring to FIG. 2, a more detailed schematic block diagram of one embodiment of an image processor 160 is illustrated. In certain embodiments, the image processor 160 may include a first processing unit 220, a second processing unit 240 and an image reconstructing unit 260. The first processing unit 220 receives the images 210 of an object from the camera 120, and processes the images by separating the images into at least two groups, each of which is taken by the camera 120 located at a different position. That is, a first group of images may be taken with a camera located at a first position and a second group of images may be taken with the camera at a second position. In certain embodiments, the first processing unit 220 may select a first and a second image taken by the camera located at a first and a second position, respectively, to obtain a first representation of the object based on the selected two images.

Figure 3:
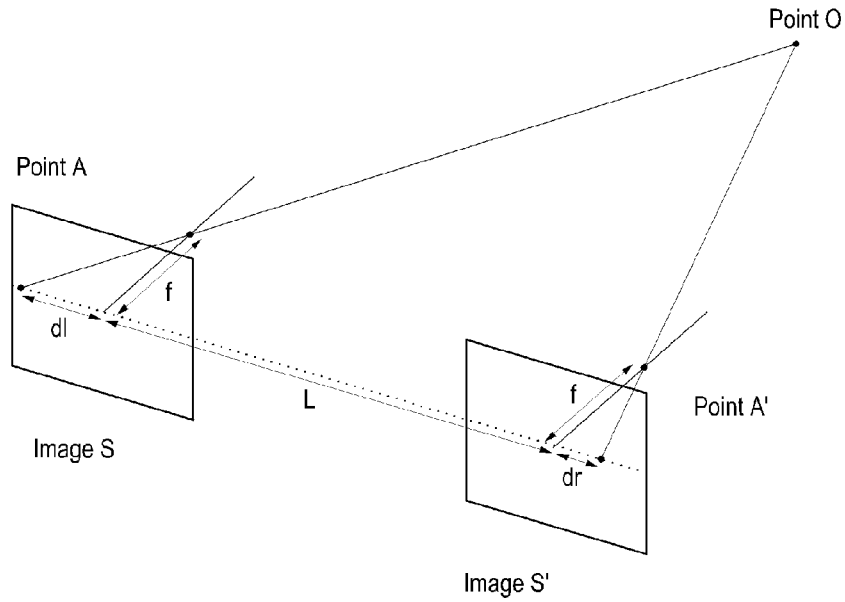
FIG. 3 shows a schematic diagram illustrating the concept of geometric stereo used in one embodiment.

For example, the first processing unit 220 may perform a geometric stereo method to generate the first representation (i.e., a depth map) of the object. FIG. 3 shows a schematic diagram illustrating the concept of a geometric stereo method used in one embodiment. As illustrated in FIG. 3, the first processing unit 220 may perform operations for estimating a distance to a point of a given object. The first processing unit 220 receives more than one image from the camera 120. For example, two images S and S' of the object are taken by using two different cameras at the same time. Alternatively, two images S and S' of the object may be taken with one camera after another by changing the position of the camera sequentially. In one embodiment, for a given point O in the object, the first processing unit 220 determines points A and N corresponding to the point O and contained in the images S and S' respectively. The first processing unit 220 may determine a distance d to the point O by applying a triangulation method, as given by the equation below:

$$d = \frac{L \times f}{dl + dr}$$

where L is a distance between center points of the two images, f is a focal length of a lens of the camera, and dl and dr are distances to the center points from the corresponding points A and A', respectively, as indicated by FIG. 3.

In selected embodiments, in order to create a reconstructed image of an object by applying the geometrical stereo, the first processing unit 220 may generate more than one depth map under different settings of light sources from those used for obtaining a previous depth map. For example, the first processing unit 220 may use two different sets of images captured under different settings of the light source 140 from those used for the first depth map, to generate two depth maps of geometric images. In other words, after obtaining one depth map as described above, the image reconstructing system 100 may change the settings, e.g., brightness, position, etc., of the light source 140. The first processing unit 220 may create another depth map under the changed settings of the light source 140. Based on the two different depth maps, the first processing unit 220 may determine the fidelity of the geometric stereo which may indicate the level of reliability of the geometric stereo at each pixel of the pictures. For example, the first processing unit 220 may calculate the fidelity of the geometric stereo as given by the equation below:

$$\text{fidelty\_g\_stereo}(x, y) = \frac{1}{1 + |A(x, y) - B(x, y)| + |\hat{z}(x, y) - \hat{w}(x, y)|}$$

where A(x, y) and B(x, y) are brightness under a first and a second setting of the light source 140, respectively, at a certain pixel (x, y) and $\hat{z}(x, y)$ and $\hat{w}(x, y)$ are depth map values under a first and a second setting of the light source 140, respectively, at a certain pixel (x, y).

In one embodiment, the second processing unit 240 may perform a photometric stereo operation to generate a slope map (so-called, a p-q map) of a photometric image, which is referred to as a second representation of the object. The image reconstructing system 100 may use the camera 120 to take one or more pictures of the object with the variance of light source in its position and perspective. By using one or more pictures, the second processing unit 240 may perform the photometric stereo method to obtain the slope of the 3-D object at each pixel of the picture. In this way, the second processing unit 240 can output feature information indicating slopes of the 3-D object, and albedo, i.e., brightness, together with reliability levels of the coefficients at each pixel of the pictures.

Figure 4:
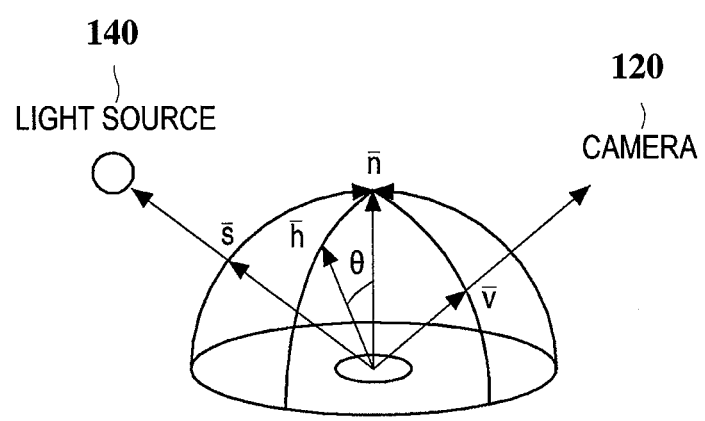
FIG. 4 is a schematic diagram for illustrating the concept of photometric stereo used in one embodiment.

FIG. 4 is a schematic diagram for illustrating the concept of a photometric stereo method used in one embodiment. As illustrated in FIG. 4, the camera 120 takes a picture of an object under a certain setting (e.g., a position) of the light source 140. For illustration purposes, the direction of the camera 120 is indicated as $\vec{v}$ and the direction of the light source 140 is represented as $\vec{S}$, and the direction perpendicular to the surface of the object is indicated as $\vec{n}$ and the reflection direction is indicated as $\vec{h}$, and the angle between $\vec{v}$ and $\vec{h}$ is given by θ. In general, the brightness at each pixel of the picture can be expressed as a function of light source direction $\vec{S}$ and the normal vector $\vec{n}$. The above three vectors, i.e., the reflection vector $\vec{h}$, the light source vector $\vec{S}$ and the camera vector $\vec{v}$ has the relation ship as follows:

$$\vec{h} = \frac{\vec{S} + \vec{v}}{|\vec{S} + \vec{v}|},$$

where |X| indicates an absolute value of "X." The second processing unit 240 may detect the brightness at each pixel of the picture and the brightness can be represented as a combination of a Lambertian component and a total reflection component as follows:

$$L = L_D + L_S = \rho_D(\vec{S} \cdot \vec{n}) + \rho_S \frac{\exp(-k\theta^2)}{\vec{v} \cdot \vec{n}}$$

where $L_D$ and $L_S$ indicate the Lambertian component and the total reflection component of the brightness L, respectively, and $\rho_D$ and $\rho_S$ are Lambertian and total reflection albedo, respectively.

For example, upon assuming the Lambertian model, the brightness at each pixel (x, y) of the picture taken by the camera 120 under the i-th setting (e.g., position) of the light source 140 may be given by the equation below:

$$L_i = E_i \rho(\vec{s}_i \cdot \vec{n}) \; i=1, 2, 3$$

where $L_i$ is the brightness of the surface of the object by the i-th position of the light source 140, $\rho$ is the albedo value and $E_i$ is a light power of the i-th setting of the light source 140, and $\vec{s}_i = [s_{ix}, s_{iy}, s_{iz}]^T$ is the direction vector of the i-th setting of the light source 140, and · indicates an inner sum operation between vectors, and $\vec{n} = [n_x, n_y, n_z]^T$ is the normal vector. Although three light source positions are given in the embodiment (i.e., i=1, 2, 3), the operations can be performed with any number of positions of the light sources. In the example, the same light power can be practically used for each setting of the light source 140 to be $E_1 = E_2 = E_3$. Then, the brightness of the surface of the object by the light source 140 can be represented as follows:

$$\vec{L} = E\rho\vec{S} \cdot \vec{n}$$
where $$\vec{L} = [L_1, L_2, L_3]^T, \vec{S} = \begin{bmatrix} s_{1x} & s_{1y} & s_{1z} \\ s_{2x} & s_{2y} & s_{2z} \\ s_{3x} & s_{3y} & s_{3z} \end{bmatrix} \text{ and, } \vec{n} = [n_x, n_y, n_z]^T$$

and $n_x$, $n_y$, $n_z$ are the x,y,z components of the normal vector $\vec{n}$, respectively.

The second processing unit 240 calculates the normal vector $\vec{n}$ from the above equation as follows:

$$\vec{n} = \frac{1}{E\rho} \vec{S}^{-1} \cdot \vec{L}$$

where $\vec{S}^{-1}$ represents the inverse vector of $\vec{S}$. For the slopes p and q at each pixel of the photometric image, the normal vector has the relationship with the slopes as follows:

$$n_x = \frac{-E\rho p}{\sqrt{1+p^2+q^2}}, n_y = \frac{-E\rho q}{\sqrt{1+p^2+q^2}} \text{ and, } n_z = \frac{-E\rho}{\sqrt{1+p^2+q^2}}.$$

From the above relationship, the second processing unit 240 may calculate the slopes p(x,y) and q(x,y) at pixel of (x, y) by using the equation below:

$$p(x, y) = \hat{z}_x = \frac{dz}{dx} = \frac{n_z}{n_x}, \text{ and } q(x, y) = \hat{z}_y = \frac{dz}{dy} = \frac{n_y}{n_y},$$

where "dz/dx" indicates differentiation of z by x.

In this way, the second processing unit 240 may generate the p-q map (i.e., the second representation) having the values p and q that indicate the slope at each pixel of the photometric image of the object. The second processing unit 240 may determine the brightness of the photometric image at each pixel thereof. For example, the second processing unit 240 may calculate the brightness of the photometric image by using the previous equation below:

$$L = L_D + L_S = \rho_D(\vec{S} \cdot \vec{n}) + \rho_S \frac{\exp(-k\theta^2)}{\vec{v} \cdot \vec{n}},$$

where $L_D$ and $L_S$ indicate the Lambertian component and the total reflection component of the brightness L, respectively, and $\rho_D$ and $\rho_S$ are Lambertian and total reflection albedo, respectively.

In selected embodiments, the second processing unit 240 may create another or more p-q maps under the changed settings (i.e., different combination of positions) of the light source 140. Based on the brightness detected by the camera 120 and the brightness of the reconstructed image, the second processing unit 240 may obtain the fidelity of the photometric stereo which may indicate the level of reliability of the photometric stereo. For example, the second processing unit 240 may calculate the fidelity of the photometric stereo as given by the equation below:

$$\text{fidelty\_p\_stereo}(x, y) = \frac{1}{1 + \sum_j C(x, y, j) - RC(x, y, j)},$$

where C(x, y, j) and RC(x, y, j) are brightness of the captured image and the reconstructed image under the j-th setting of the light source 140, respectively, at a certain pixel (x, y).

Referring back to FIG. 2, the first processing unit 220 delivers the depth maps of the object and the fidelity of the geometric stereo to the image reconstructing unit 260. The second processing unit 240 delivers the p-q maps of the object and the fidelity of the photometric stereo to the image reconstructing unit 260. The image reconstructing unit 260 reconstructs a surface of the object by using the information on the depth maps and the p-q maps. In one embodiment, the image reconstructing unit 260 may find an optimum surface function z(x, y) of the object that minimizes a distance d to the depth map and the p-q map by performing a numerical operation, e.g., a least square minimization algorithm. For example, the image reconstructing unit 260 may define the distance as follows:

$$d = \iint a \cdot (|z_x - \hat{z}_x|^2 + |z_y - \hat{z}_y|^2) + b \cdot (|z - \hat{z}|^2) dx dy$$

where a and b indicate the fidelity values of the photometric stereo and the geometric stereo at pixel (x, y), respectively, $z_x$ indicates differentiation of z by x, $\hat{z}_x$ and $\hat{z}_y$ indicate the p-q map values at pixel (x, y), and $\hat{z}$ represents depth map value at pixel (x, y). In order to find the optimum surface function, the image reconstructing unit 260 represents the surface function z(x, y) by using the given basis functions $\phi(x, y, \phi)$ as follows:

$$z(x, y) = \sum_{\omega \in \Omega} C(\omega) \phi(x, y, \omega),$$

where $\omega = (\omega_x, \omega_y)$ is a two-dimensional index, $\Omega$ is a finite set of indexes, and $C(\omega)$ is an expansion coefficient. The image reconstructing unit 260 may calculate the coefficients $\hat{C}(\omega)$ of depth map $\hat{z}(x, y)$ for each basis function to represent the depth map as follows:

$$\hat{z}(x, y) = \sum_{\omega \in \Omega} \hat{C}(\omega) \phi(x, y, \omega).$$

Figure 5:
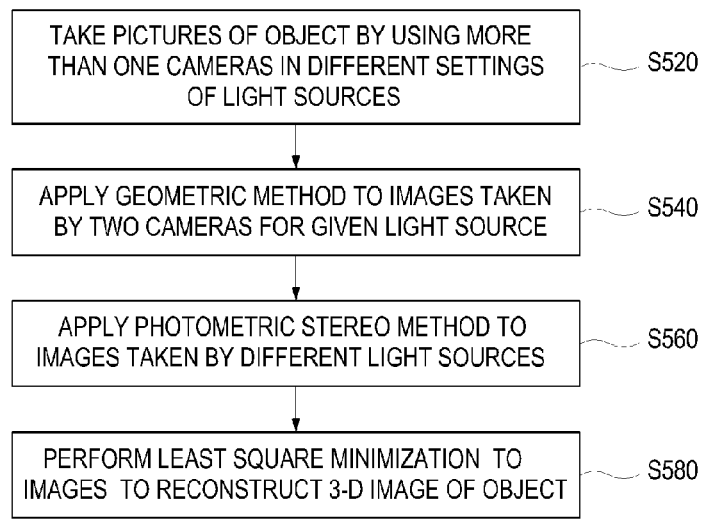
FIG. 5 is a flow chart that illustrates reconstructing an image of an object according to one embodiment.

For the p-q map values $\hat{z}_x(x, y)$ and $\hat{z}_y(x, y)$, the image reconstructing unit 260 may calculate the coefficients $\hat{C}_1(\omega)$ and $\hat{C}_2(\omega)$ for each basis function to represent the p-q map values as follows:

$$\hat{z}_x(x, y) = \sum_{\omega \in \Omega} \hat{C}_1(\omega) \phi_x(x, y, \omega)$$

$$\text{and } \hat{z}_y(x, y) = \sum_{\omega \in \Omega} \hat{C}_2(\omega) \phi_y(x, y, \omega),$$

where $\phi_x(x, y, \omega)$ and $\phi_y(x, y, \omega)$ are partial derivatives of $\phi(x, y, \omega)$ by x, and y, respectively. The image reconstructing unit 260 may find the surface function $z(x, y)$ that minimizes the distance d by calculating the expansion coefficients of the surface function as follows:

$$C(\omega) = \frac{a \cdot \left( P_x(\omega) \hat{C}_1(\omega) + P_y(\omega) \hat{C}_2(\omega) \right) + b \cdot P(\omega) \hat{C}(\omega)}{a \cdot (P_x(\omega) + P_y(\omega)) + b \cdot P(\omega)},$$

where $P_x(\omega)$, $P_y(\omega)$, $P(\omega)$ can be given as follows: $P_x(\omega) = \iint |\phi_x(x, y, \omega)|^2 dxdy$, $P_y(\omega) = \iint |\phi_y(x, y, \omega)|^2 dxdy$ and $P(\omega) = \iint |\phi(x, y, \omega)|^2 dxdy$, respectively. In this way, the image reconstructing unit 260 inserts the above-calculated coefficients of the surface function into the equation $$z(x, y) = \sum_{\omega \in \Omega} C(\omega) \phi(x, y, \omega)$$

to generate the surface function, thereby reconstructing the image of the object. Referring to FIG. 5, one embodiment of a method for reconstructing an image of an object is illustrated. Initially at operation 520, a user may use the camera 120 of the image reconstructing system 100 to take pictures of an object. The user may take various types of pictures of the object, including pictures captured by one or more camera at two or more different positions under two or more predetermined settings of the light source 140. In this way, the camera 120 may provide the image processor 160 with at least four different pictures of the object depending on the combination of the camera positions and the light source settings. For example, the image processor 160 may be provided with four different pictures, e.g., a first picture taken by a first camera position under a first setting of the light source 140, a second picture taken by a second camera position under a first setting of the light source 140, a third picture taken by a first camera position under a second setting of the light source 140, and a fourth picture taken by a second camera position under a second setting of the light source 140. In order to take two or more pictures of the object with different camera positions, one camera may be used by moving its location sequentially or two cameras may be used at the same time.

At operation 540, the first processing unit 220 generates a first representation of the object from the pictures of the object, each picture taken by the one or more cameras having a different camera position. For instance, the first processing unit 220 may apply a geometric method to the first and the second pictures that are taken by one or more cameras located at two different positions under the first setting of the one or more light sources. The first processing unit 220 operates the first and the second pictures according to the geometric method, thereby generating the first representation (e.g., a first depth map) of the object. In one embodiment, the first processing unit 220 may apply a geometric method to the third and the fourth pictures that are taken by one or more cameras in the two different positions under the second setting of the one or more light sources, thereby additionally generating a third representation (e.g., a second depth map) of the object. The first processing unit 220 delivers the first and the third representation of the object together with the pictures taken by the camera 120 to the image reconstructing unit 260.

At operation 560, the second processing unit 240 generates a second representation of the object from the pictures of the object, each picture taken by the one or more cameras having a different setting of the light source 140. For instance, the second processing unit 240 may apply a photometric method to the first and the third pictures that are taken by one or more cameras under two different settings (e.g., different positions) of the light sources 140. The second processing unit 240 operates the first and the third pictures according to the photometric method, thereby generating the second representation (e.g., a first p-q map) of the object. In one embodiment, the second processing unit 240 may apply a photometric method to another set of two pictures that are taken by one or more cameras at the same position as taking the first and the third pictures respectively under two different settings (e.g., different positions) of the light sources 140, thereby generating a fourth representation (e.g., a second p-q map) of the object. The first second processing unit 240 delivers the second and the fourth representation of the object to the image reconstructing unit 260.

In operation 580, the image reconstructing unit 260 receives the representations of the object from the first and the second processing unit 220 and 240 to generate a reconstructed image. The image reconstructing unit 260 may perform a numerical operation such as least square minimization algorithm to the first and the second representations of the object, thereby finding an optimum surface function $z(x, y)$ of the object that has the least distance from the first and the second representation of the object. In this case, the image reconstructing unit 260 can determine the fidelity values (a and b) of the photometric stereo and the geometric stereo at pixel $(x, y)$ in the above equation $d = \iint a \cdot (|z_x - \hat{z}_x|^2 + |z_y - \hat{z}_y|^2) + b \cdot (|z - \hat{z}|^2) dxdy$ to be, e.g., both 1. The image reconstructing unit 260 determines the surface function $z(x, y)$ that minimizes the distance d by performing the least square algorithm as described above. Alternatively, the image reconstructing unit 260 may calculate a first fidelity level from the first and the third representation of the object, and a second fidelity level from the second and the fourth representation of the object. For example, the image reconstructing unit 260 may calculate the fidelity of the geometric image by using the above equation, $$\text{fidelty\_g\_stereo}(x, y) = \frac{1}{1 + |A(x, y) - B(x, y)| + |\hat{z}(x, y) - \hat{w}(x, y)|},$$

where A(x, y) and B(x, y) are the brightness of the first and the second picture, respectively, at a certain pixel (x, y) and $\hat{z}$(x, y) and $\hat{w}$(x, y) are depth map values of the first and the third representation of the object, respectively, at a certain pixel (x, y). The image reconstructing unit 260 may calculate the fidelity of the photometric image by using the above equation, $$\text{fidelty\_p\_stereo}(x, y) = \frac{1}{1 + \sum_j C(x, y, j) - RC(x, y, j)},$$

where C(x, y, j) is the brightness of the first and the second picture and RC(x, y, j) is the brightness of the second and the fourth representation of the object, respectively, at a certain pixel (x, y) (j=1 and 2 in this example). The image reconstructing unit 260 determines the surface function z(x, y) that minimizes the distance d by performing the least square algorithm by using the fidelities of the geometric and the photometric as weights (a and b). In this way, the image reconstructing unit 260 may find optimum surface function z(x, y) that minimizes the distance d by performing the least square algorithm as described above, thereby generating the reconstructed image of the object.

In light of the present disclosure, those skilled in the art will appreciate that the apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

The present disclosure may be embodied in other specific forms without departing from its basic features or characteristics. Thus, the described embodiments are to be considered in all respects only as illustrative, and not restrictive. The scope of the disclosure is, therefore, indicated by the appended claims, rather than by the foregoing description. All changes within the meaning and range of equivalency of the claims are to be embraced within their scope.

The invention claimed is:

1. An image reconstructing system comprising: one or more cameras configured to capture images of an object; one or more light sources configured to irradiate the object; and an image processor configured to process the images to generate a first representation of the object and a second representation of the object, and to generate a reconstructed image of the object based on the first representation and the second representation,
   wherein the one or more cameras are configured to capture a first and a second image of the object in a first and a second camera position respectively, with the object being irradiated with a first setting of the one or more light sources, and
   to capture a third and a fourth image of the object in the first and the second camera position respectively, with the object being irradiated with a second setting of the one or more light sources,
   wherein a first processing unit is configured to perform a geometric stereo method to generate the first representation of the object based on the first and the second images, and
   a second processing unit is configured to perform a photometric stereo method to generate the second representation of the object based on the first and the third images.

2. The image reconstructing system of claim 1, further comprising a display configured to display the reconstructed image.

3. The image reconstructing system of claim 1, wherein the first processing unit is further configured to generate a third representation of the object based on the third and the fourth images, and to calculate a first reliability level based on the first and the third image and the first and the third representation.

4. The image reconstructing system of claim 3, wherein the second processing unit is further configured to calculate a second reliability level based on the first image and the second representation.

5. The image reconstructing system of claim 4, wherein the image processor includes an image reconstructing unit configured to generate the reconstructed image by using the first and the second representation and the first and the second reliability level.

6. The image reconstructing system of claim 5, wherein the image reconstructing unit performs a weighted least square minimization to the first and the second representation by using the first and the second reliability level as weights.

7. The image reconstructing system of claim 1, wherein the reconstructing system is a portable device.

8. The image reconstructing system of claim 7, wherein the reconstructing system is a cellular phone.

9. An image reconstructing method comprising: capturing images of an object by using one or more cameras, the object irradiated by two or more settings of one or more light sources; processing the images to generate a first representation of the object, and a second representation of the object; and generating a reconstructed image of the object based on the first representation and the second representation,
   wherein capturing images includes capturing a first and a second image of the object respectively irradiated with a first setting of the one or more light sources, each of the first and the second image captured by the one or more cameras in a first and a second position, and
   capturing a third and a fourth image of the object respectively irradiated with a second setting of the one or more light sources, each of the third and the fourth image taken by the one or more cameras in the first and the second position,
   wherein processing the image includes generating the first representation based on the first and the second image, and generating the second representation based on the first and the third image,
   wherein processing the images includes applying a geometric stereo method to generate the first representation of the object, and applying a photometric stereo method to generate the second representation of the object.

10. The image reconstructing method of claim 9, further comprising displaying the reconstructed image.

11. The image reconstructing method of claim 10, wherein processing the image further includes generating a third representation based on the third and the fourth image.

12. The image reconstructing method of claim 11, wherein processing the image further includes calculating a first reliability level based on the first and the third representation and the first and the third image.

13. The image reconstructing method of claim 12, wherein processing the image further includes calculating a second reliability level based on the second representation and the first image.

14. The image reconstructing method of claim 13, wherein generating the reconstructed image includes generating the reconstructed image by using the first and the second reliability level.

15. The image reconstructing method of claim 14, wherein generating the reconstructed image includes performing a weighted least square minimization to the first and the second representation by using the first and the second reliability level as weights.

16. A non-transitory computer-readable storage medium having stored thereon computer instructions that when executed by a computer cause the computer to perform a method for reconstructing an image, the method comprising: capturing images of an object irradiated by two or more settings of one or more light sources by using one or more cameras; processing the images to generate a first representation of the object, and a second representation of the object; and generating a reconstructed image of the object based on the first representation and the second representation, wherein capturing images includes capturing a first and a second image of the object respectively irradiated with a first setting of the one or more light sources, each of the first and the second image captured by the one or more cameras in a first and a second position, and capturing a third and a fourth image of the object respectively irradiated with a second setting of the one or more light sources, each of the third and the fourth image taken by the one or more cameras in the first and the second position, wherein processing the image includes generating the first representation based on the first and the second image, and generating the second representation based on the first and the third image, wherein processing the images includes applying a geometric stereo method to generate the first representation of the object, and applying a photometric stereo method to generate the second representation of the object.

17. The computer-readable storage medium of claim 16, the method further comprises displaying the reconstructed image.

18. The computer-readable storage medium of claim 16, wherein processing the image further includes generating a third representation based on the third and the fourth image.

* * * * *